United States Patent [19]
Kadota

[11] Patent Number: 6,030,316
[45] Date of Patent: Feb. 29, 2000

[54] DRIVE BY WIRE FAIL SAFE CONTROL TO FIX THE VEHICLE SPEED AT A PRESET SPEED

[75] Inventor: Yoichi Kadota, Tokyo, Japan

[73] Assignee: Mitsubishi Denki Kabushiki Kaisha, Tokyo, Japan

[21] Appl. No.: 09/298,915

[22] Filed: Apr. 26, 1999

[30] Foreign Application Priority Data

Oct. 29, 1998 [JP] Japan ............................. 10-308893

[51] Int. Cl.[7] .................................................. F02D 45/00
[52] U.S. Cl. ............................ 477/121; 477/906; 701/62
[58] Field of Search ................................... 477/121, 125, 477/906, 907; 701/62, 63

[56] References Cited

U.S. PATENT DOCUMENTS

| 5,233,530 | 8/1993 | Shimada et al. ................. 123/361 X |
| 5,366,424 | 11/1994 | Wataya ............................ 477/907 X |
| 5,391,127 | 2/1995 | Nishimura ......................... 477/110 |
| 5,415,605 | 5/1995 | Yoshimura et al. ................. 477/121 |
| 5,601,063 | 2/1997 | Ohashi et al. ..................... 123/396 |
| 5,629,852 | 5/1997 | Yokoyama et al. .................. 701/62 |
| 5,779,593 | 7/1998 | Takada ............................. 477/107 |
| 5,976,056 | 9/1999 | Matsumoto et al. ................ 477/906 X |

FOREIGN PATENT DOCUMENTS

2-201061  8/1990  Japan.

*Primary Examiner*—Khoi Q. Ta
*Attorney, Agent, or Firm*—Sughrue, Mion, Zinn, Macpeak & Seas, PLLC

[57] ABSTRACT

When the ETV control system runs into trouble, drivability and safety are secured against the system trouble by fixing the step of speed change at a high speed position if the vehicle is running forward or stopping fuel feed to a specific cylinder or cylinders if it is running backward. When the electronic throttle control system runs into trouble, the throttle valve 3 is released from control by stopping power supply to the motor 1, the throttle value 3 is mechanically fixed in a preset position, and the transmission 2 is fixed in a high speed position if the vehicle is running forward, thereby to reduce engine acceleration and the shock to the body due to unnecessary speed change action, or fuel feed to a specific cylinder or cylinders is stopped according to the engine condition if the vehicle is running backward, thereby to reduce the engine output, so that the vehicle be enabled to run smoothly.

4 Claims, 5 Drawing Sheets

DRIVE BY WIRE FAIL SAFE CONTROL TO FIX THE VEHICLE SPEED AT A PRESET SPEED

BACKGROUND OF THE INVENTION

1. Field of the Invention

The present invention relates to an output control system for automobile engines, which regulates the air intake into the engine by opening and closing the throttle valve of an automobile engine under electronic control and thereby controls the power output of the engine.

2. Description of Related Art

In a conventional vehicle, as the driver steps on the accelerator, the cable connected to the accelerator is operated according to the depth to which the pedal is pressed down, the throttle valve of the air suction pipe of the engine is thereby mechanically operated, and the air intake of the engine is thereby regulated to control the power output of the engine.

In recent years, along with the advancement of electronic engine control technology, interest has come to be focused on electronic throttle control systems which electrically detect the depth to which the driver presses down the accelerator, and electrically operate the throttle valve according to-the detected depth to control the output of the engine.

Examples of the prior art pertaining to such electronic control systems include the "engine output control method" disclosed in the Japanese Patent Laid-open No. 201061/1990, whereby the target torque of the engine is calculated from the degree of accelerator opening, vehicle speed and engine revolutions, and the throttle valve is operated by an electric motor in accordance with the result of calculation to control the output of the engine.

1. Fine Control of the Air Intake

In order to satisfy the official restrictions on various emissions, which are becoming increasingly stringent every year, by such a way of engine output control, the engine should be subjected to highly sophisticated combustion control, and this in turn requires fine control of the air intake which determines the condition of combustion.

An engine control apparatus using this method is enabled to accurately control the air/fuel ratio (the ratio between the quantity of air sucked into the engine and that of fuel), which impacts the characteristics of the exhaust gas from the engine by regulating not only the quantity of fuel fed to the engine but also the air intake to the engine with an electronic throttle control system, and it has been made possible to reduce gas emissions by achieving an ideal condition of combustion in each state of vehicle driving.

2. Engine Torque Control With a High Degree of Freedom

While the use of such an electronic throttle control system has made it possible to control the engine output matched with the driver's driving action according to the running state of the vehicle, it is also made possible to set the output control as desired in compliance with the requirement of the engine and thereby to achieve desired engine output characteristics with a high degree of freedom.

Furthermore, in recently developed engines wherein combustion takes place with a very dilute fuel-air mixture, such as in-cylinder fuel-injected engines, seemingly in contradiction with the requirements for reduced fuel combustion, suppressed emissions and enhanced power output, when switching is done between normal combustion and combustion with a dilute fuel-air mixture with the degree of accelerator opening kept constant, i.e. with the driver's demand for engine torque kept constant, it is necessary to control the air intake to the engine in order to restrain fluctuations in engine output torque. Compared with earlier dilute combustion engines, in-cylinder fuel-injected engines entail a broader range of air intake control because the fuel-air mixture is much more dilute, and the air intake accordingly requires even finer control than before.

3. Collective Control of Engine Output

For controlling the air intake (torque) of the engine, the prior art provides an apparatus to control the idling of the engine by regulating the quantity of air feed through an air passage which bypasses the throttle valve during idling i.e. when the throttle valve is closed.

Further, for controlling the output of the engine by regulating the throttle valve only in a specific state of driving, there are available a cruise control apparatus for regulating the vehicle speed at a driver-set level by feedback, and a traction control apparatus for restraining the engine output if the tires slip when starting on a slippery road.

These ways of engine output control make possible collective control with an electric throttle valve (ETV) control device, and contribute to simplification of the overall system configuration of the engine and to highly precise engine output control.

Because of its extremely important function to control the output of the engine as stated above, the ETV control system is so designed as not to allow engine revolutions to rise abnormally even if the system fails.

More specifically, when the throttle valve controlling motor is made unable to operate normally by disconnection or short-circuiting in the driving circuit for the throttle valve controlling motor, disconnection of the motor coil or any other similar cause, the throttle valve is released from motor control by cutting off power supply to the throttle valve controlling motor, and limp-home operation is done with a mechanism to fix the throttle valve in a preset position mechanically. As a result, drivability during limp-home operation and safety during system failure can be enhanced.

The operation of an apparatus according to the prior art will be described below with reference to a timing chart presented herein as FIG. 2.

Figure 2:
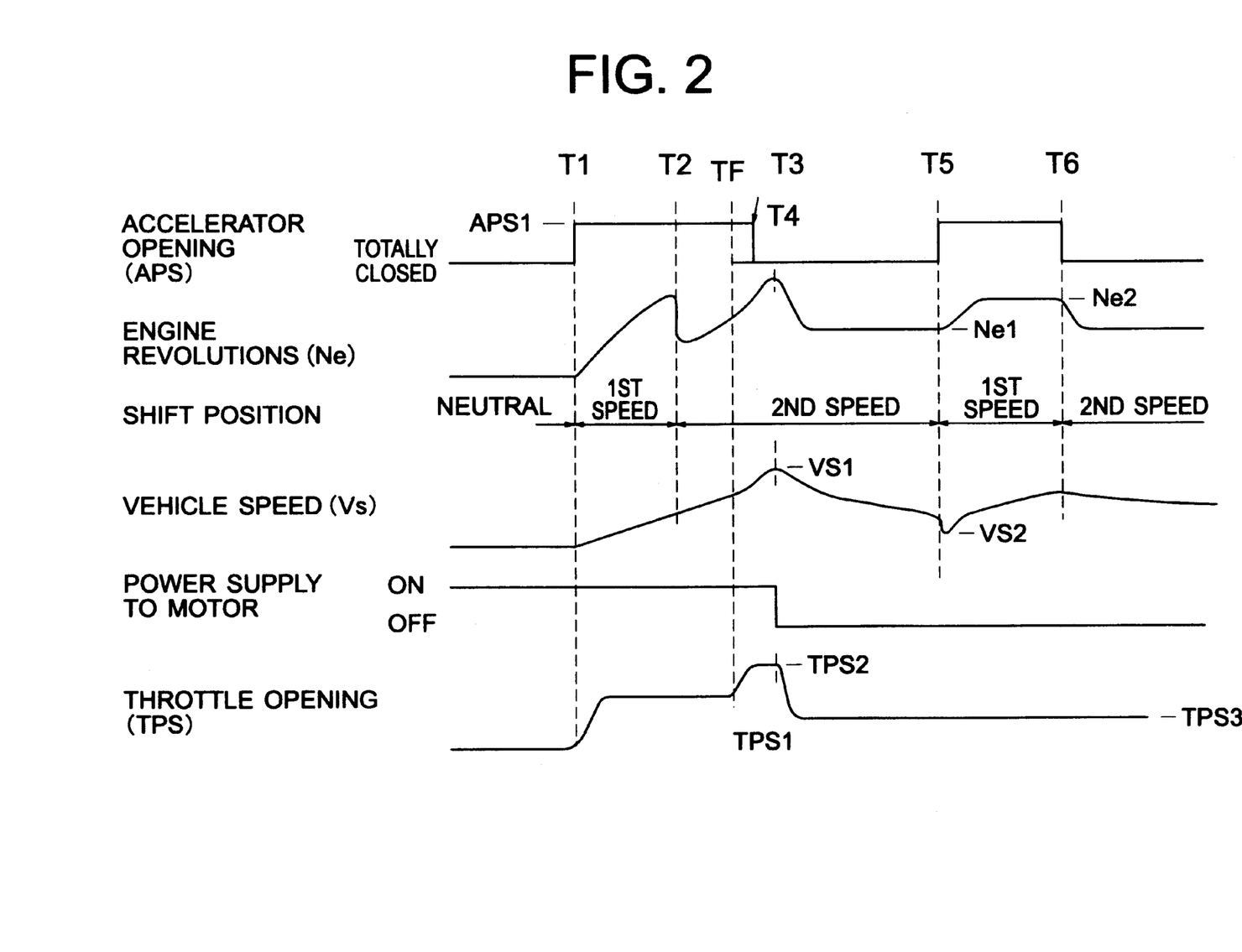
FIG. 2 is a timing chart for describing the operation of an apparatus according to the prior art.

The timing chart of FIG. 2 illustrates, from a point of time T1 to T6, how the engine and the vehicle behave when the accelerator is opened from a totally closed state to APS 1 at the point of time T1, closed from APS 1 to the totally closed state at the point of time T3, and opened again from the totally closed state to the position of APS1 from the point of time T5 to T6.

First the number of revolutions of the engine until the point of time T1 indicates idling with the accelerator totally closed, and at the point of time T1, the shift lever is shifted from its neutral position to the drive range (D range) at the point of time T1, and along with that the throttle valve is opened by an ETV unit to TPS1. However, if, after a further shift to the second speed is effected by a transmission control unit (TCU) at the point of time T2, an abnormality occurs in the ETV system at a point of time TF and the throttle valve further opens to TPS 2, the engine revolutions (Ne) and the vehicle speed (Vs) will turn toward a higher speed range against the driver's will.

Although the driver becomes aware of the abnormality and moves his or her foot off the accelerator at the point of time T3, the throttle opening will be kept at TPS2 until the point of time T4 when an ECU detects the abnormality in the ETV system and turns off power supply to the motor driving the throttle valve. After that, the release of the throttle valve from motor control and its mechanical closing to a preset fail-safe opening (TPS3) bring down the vehicle speed (Vs) gradually from VS1, and the engine revolutions (Ne) also converge to Ne1.

After that, when the driver again steps on the accelerator at the point of time T5, as the TCU determines the step of speed change to be selected according to the accelerator opening and the engine revolutions, shifting will take place from the second to the first speed. However, a speed change takes place in a condition wherein the throttle valve opening remains stuck at TPS3 and moreover the air intake volume also is constant, and the vehicle speed once drops momentarily to VS2 with the shock of speed change and rises again, with the engine revolutions also rising to Ne2. After that, if the driver moves his or her foot off the accelerator, shifting will again take place to the second speed, and the engine revolutions will drop to Ne1.

BRIEF SUMMARY OF THE INVENTION

OBJECT OF THE INVENTION

Apparatuses according to the prior art, as described above, in the event that the ETV control system runs into trouble and becomes unable to control the throttle valve with the motor driving circuit, will cut off the throttle valve from the motor drive system and mechanically fix it in a prescribed opening position and thereby make possible minimum limp-home operation.

However, in the case of a vehicle with an automatic transmission, where a conventional electronically controlled throttle unit does not operate interlocked with automatic transmission control in the limp-home mode, if the driver operates the accelerator by mistake in the limp-home mode, speed change control will take place interlocked with the accelerating action and invite a shock of speed change.

It is well conceivable that the driver is unable to operate the accelerator with composure in the emergency of ETV system trouble making the engine output uncontrollable, resulting in a problem that, if a shock of speed change then occurs on the vehicle body at the same time, the driver may be further upset and prevented from safe driving.

The present invention, attempted to obviate the problem noted above, is intended to provide an output control system for automobile engines which can ensure smooth shifting to the limp-home mode and prevent unnecessary shocks of speed change even if an ETV system failure makes the engine output uncontrollable.

SUMMARY OF THE INVENTION

According to a first aspect of the invention, there is provided an output control system for automobile engines comprising: a throttle valve for adjusting the air intake to an engine; a drive control means for effecting drive control on this throttle valve; an opening detecting sensor for detecting the degree of opening of this throttle valve; a failure determining means for determining any trouble in said drive control means from any excessive opening of said throttle valve relative to the target condition of driving; and a vehicle speed fixing means for undoing the control action by said drive control means, when the failure determining means determines the failure of said drive control means, and fixes the vehicle speed at a preset value.

According to a second aspect of the invention, the vehicle speed fixing means of an output control system for automobile engines determines the direction in which the vehicle is running, fixes the step of speed change at a high speed step if it determines the direction to be forward, and fixes the vehicle speed at a level corresponding to this fixed high speed step.

According to a third aspect of the invention, the vehicle speed fixing means of an output control system for automobile engines determines the direction in which the vehicle is running, stops fuel feed to a specific cylinder or cylinders in the engine if it determines the direction to be backward, and fixes the vehicle speed by appropriately restricting the engine revolutions.

According to a fourth aspect of the invention, the vehicle speed fixing means of an output control system for automobile engines varies the number of cylinders to which fuel feed is to be stopped according to the opening degree of the accelerator.

DETAILED DESCRIPTION OF THE PREFERRED EMBODIMENTS

Embodiment 1

Next will be described an output control system for automobile engines, which is a first preferred embodiment of the present invention with reference to drawings.

Figure 1:
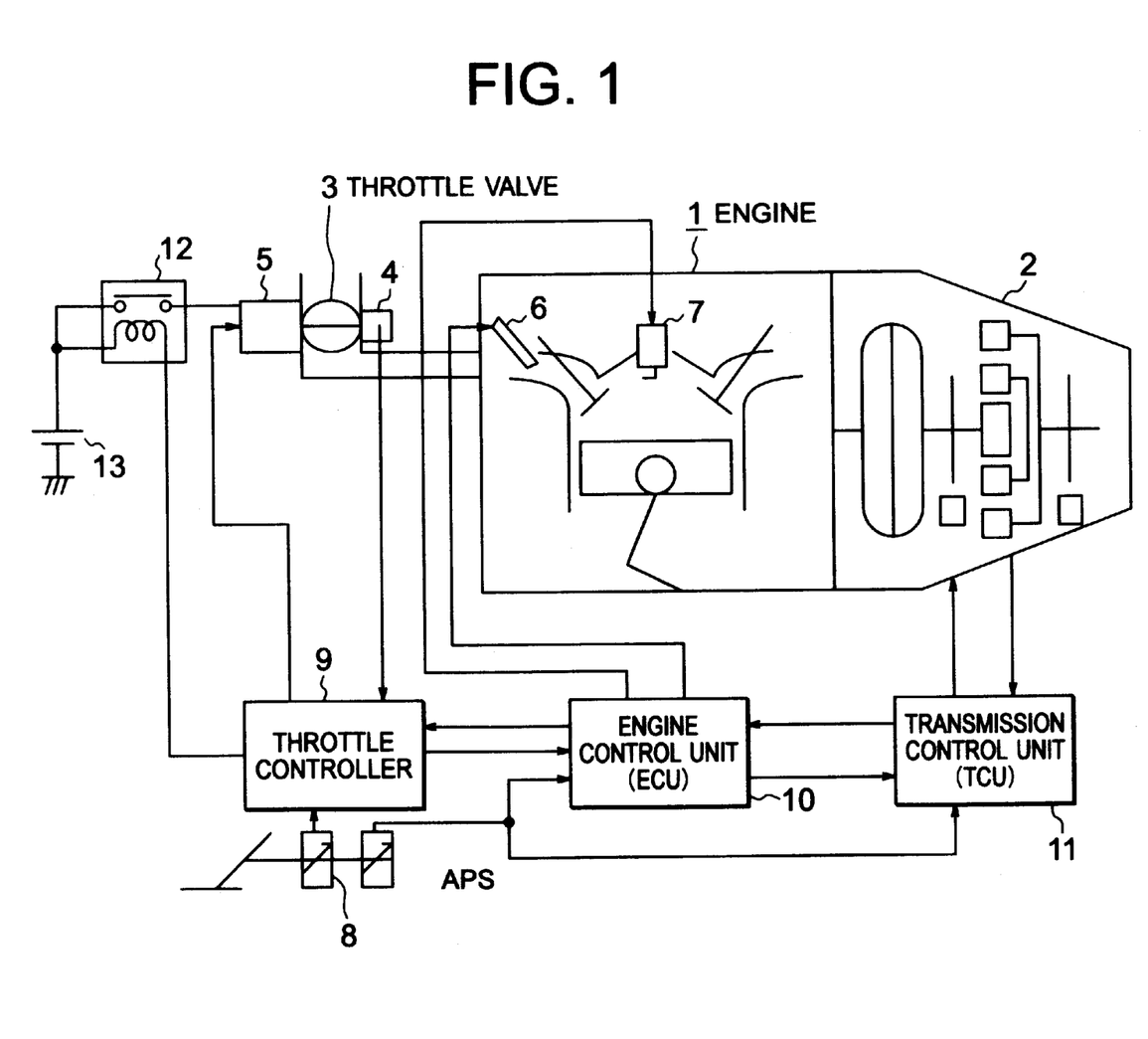
FIG. 1 illustrates the overall configuration of an output control system for automobile engines.

FIG. 1 illustrates the overall configuration of this first preferred embodiment of the invention. Arrows in the diagram represent the flows of signals (information) between the respective sensors, operating units and actuators. First in FIG. 1, reference numeral 1 denotes an ordinary automobile engine; 2, a transmission connected to the output shaft of the engine 1; and 3, a throttle valve, fitted to the air intake pipe of the engine 1, for adjusting the air intake to the engine 1.

Reference numeral 4 denotes a throttle opening sensor (TPS) for detecting the position of the throttle valve 3; 5, an actuator (electric motor), operating in accordance with an instruction signal from a throttle controller 9, for actuating the throttle valve 3; and 8, an accelerator opening sensor (APS) for detecting the position of the accelerator operated by the driver.

Opening information from the accelerator opening sensor (APS) 8, because it is an essential signal for determining the engine output, is composed in a double structure in this embodiment of the invention. Reference numeral 10 denotes an engine control unit (ECU) for recognizing the engine output demanded by the driver from the output of the APS 8, calculating the quantity of fuel feed, that of air intake, and the timing of ignition among other factors needed to meet the demand, and controlling the engine output on that basis.

Reference numerals 6, 7 and 12 all denote actuators controlled by signals from the ECU 10, with 6 denoting an injector for feeding fuel to the engine 1; 7, an ignition plug for igniting the fuel to be combusted in the engine 1; and 11, a transmission control unit (TCU) for controlling the step of speed change of the transmission 2, engaging in communication of information with the ECU 10 and transmitting information on the step of speed change to the engine 1. Reference numeral 12 denotes a relay for power supply to the 1 throttle valve actuator (electric motor) 5; and 13, a battery for supplying power to the electric motor 5 via the power supply relay 12.

Incidentally, in this configuration, the electric motor 5, throttle controller 9 and power supply relay 12 constitute a drive control means; the throttle controller 9 and the ECU 10 constitute a failure determining means; and the ECU 10 and the TCU 11 constitute a vehicle speed fixing means.

Figure 3:
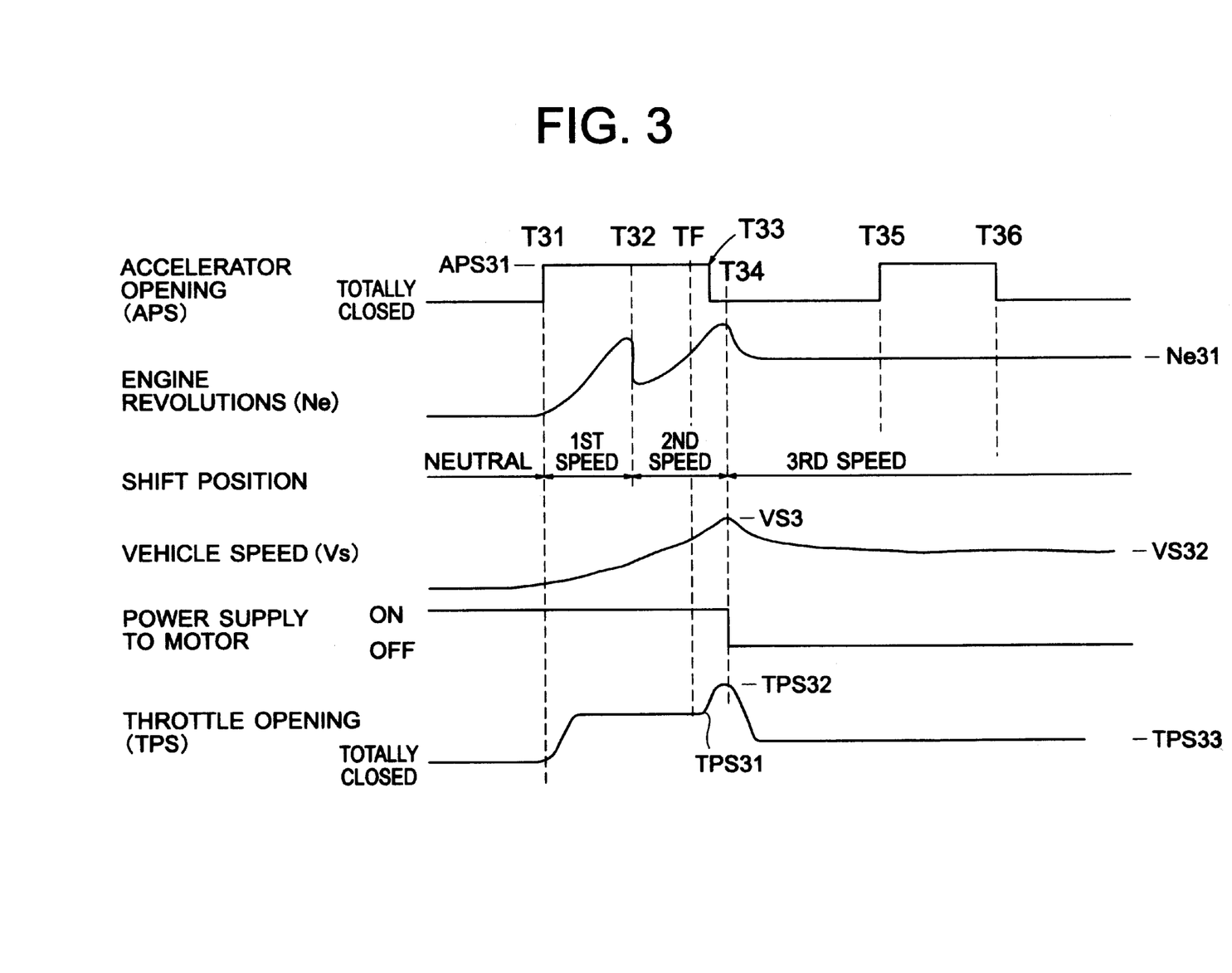
FIG. 3 is a timing chart for describing the operation of a first preferred embodiment of the present invention.

Next, the control operation by this Embodiment 1 will be described with reference to the timing chart of FIG. 3. This timing chart illustrates how the engine and the vehicle behave when the accelerator is opened from a totally closed state to APS 31 at the point of time T31, closed from a fully open state to the totally closed state at the point of time T33 and, after being fully opened again to the APS 31 position, totally closed at the point of time T36.

First, until the point of time T31, as the accelerator is totally closed, the engine revolutions (Ne) are at an idling level. Then, the shift lever is shifted from the neutral position to the drive range (D range) at the point of time T31, and along with that the throttle valve 3 is opened to TPS 31 by the throttle controller 9.

If, after shifting to the second speed is effected by the TCU 11 at the point of time T32, an abnormality arises in the ETV system at the point of time TF, and the throttle valve 3 is opened further to TPS 32, the engine revolutions (Ne) and the vehicle speed (Vs) will rise against the driver's will. At the point of time TF, the behavior of the engine and the vehicle when the ETV system is in an abnormal state is vividly indicated. Incidentally, conceivable causes for the abnormality in the ETV system include a failure in the TPS 4, electric motor 5, power supply relay 12 or wiring for the power source 13.

The driver, becoming aware of the abnormality, moves his or her foot off the accelerator at the point of time T33, but the throttle opening (TPS) is held at TPS 32 until the point of time T34, when the ECU 10 detects the system trouble and cuts off power supply from the battery 3 to the motor 5 driving the throttle valve 3 After that, the vehicle speed (VS) is gradually reduced from VS1 as the TPS closes the throttle opening to the mechanically set fail-safe opening (TPS33), and the engine revolutions (Ne) also converge to Ne 31.

At the same time as the determination of the failure, failure information is transmitted by the TPS 4 at the TCU 11 via the throttle controller 9 and the ECU 10. The TCU 11 fixes the step of speed change of the transmission 2 at the third speed. After that, even if the driver again presses down the accelerator to APS 31 between the points of time T35 and T36, the vehicle will not respond to the accelerator operation because the step of speed change is fixed at the third speed, and instead there will be neither an abnormal rise in engine revolutions nor a shock on the body due to a speed change, but the vehicle will keep on running smoothly with the engine revolutions (Ne) held at Ne 31 and the vehicle speed (VS) at Vs 32. Moreover, as the vehicle does not follow the accelerating action, the driver is enabled to perceive the failure of the vehicle without being upset.

As described above, during limp-home driving, by fixing the step of speed change at a high speed level during forward running of the vehicle, the driver is substantially relieved from the awkward feeling in vehicle driving, which is caused by variations in engine revolutions and vehicle speed due to changes in various loads on the engine and to unnecessary speed changes by the driver's accelerator operation.

Embodiment 2

Figure 4:
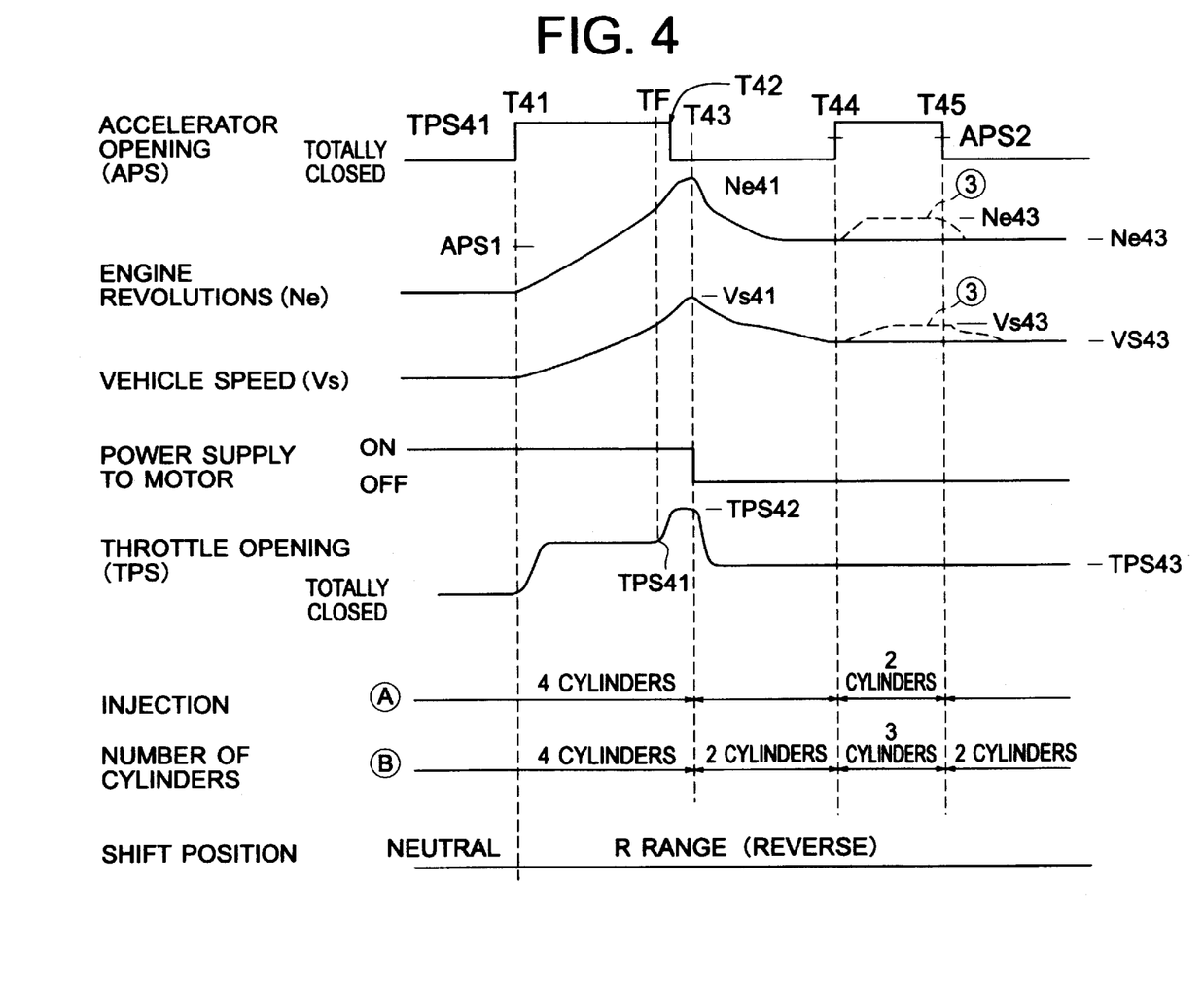
FIG. 4 is a timing chart for describing the operation of a second preferred embodiment of the present invention.

FIG. 4 illustrates the behavior of the engine and of the vehicle when an abnormality has occurred in the ETV system during backward running of the vehicle.

Since it is impossible to select a step of speed change for high speed when the vehicle is running backward, the minimum level of drivability is ensured by restraining the engine revolutions (engine output) by stopping fuel feed to a prescribed cylinder or cylinders or adjusting the engine output by changing the number of cylinders to which fuel feed is to be stopped according to the degree of accelerator operation by the driver.

Next will be described the control operation of this Embodiment 2 with reference to the timing chart of FIG. 4. This timing chart illustrates how the engine and the vehicle behave when the accelerator is opened from a totally closed state to APS 41 at the point of time T41, closed from a fully open state to the totally closed state at the point of time T43 and, after being fully opened again to the APS 41 position at the point of time T45, totally closed at the point of time T46.

First, until the point of time T41, as the accelerator is totally closed, the engine revolutions (Ne) are at an idling level. Then, the shift lever is shifted from the neutral position to the drive range (D range) at the point of time T41, and along with that the throttle valve 3 is opened to TPS 41 by the throttle controller 9.

If, after shifting to the second speed is effected by the TCU 11 at the point of time T42, an abnormality arises in the ETV system at the point of time TF, and the throttle valve 3 is opened further to TPS 42, the engine revolutions (Ne) and the vehicle speed (Vs) will rise against the driver's will. At the point of time TF, the behavior of the engine and the vehicle when the ETV system is in an abnormal state is vividly indicated. Incidentally, conceivable causes for the abnormality in the ETV system include a failure in the TPS 4, electric motor 5, power supply relay 12 or wiring for the power source 13.

The driver, becoming aware of the abnormality, moves his or her foot off the accelerator at the point of time T43, but the throttle opening (TPS) is held at TPS 42 until the point of time T44, when the ECU 10 detects the system trouble and cuts off power supply from the battery 3 to the motor 5 driving the throttle valve 3. After that, the vehicle speed (VS) is gradually reduced from VS41 as the TPS closes the throttle opening to the mechanically set fail-safe opening (TPS43), and the engine revolutions (Ne) also converge to Ne 42.

In this embodiment, even if the driver again presses down the accelerator to APS 41 between the points of time T44 and T45, the vehicle will not respond to the accelerator operation because the fuel feed to a prescribed cylinder or cylinders is stopped (fuel cut) at the same time as the determination of the failure, but the vehicle will keep on running smoothly with the engine revolutions (Ne) converging and being held at Ne 42, and the vehicle speed (VS) at Vs 42.

Next, after the fuel feed to a prescribed cylinder or cylinders is stopped (fuel cut) at the same time as the determination of the failure, if the driver again presses down the accelerator to APS 41 between the points of time T44 and T45 and the degree to which the accelerator is pressed down is not less than a prescribed level (APS42), it is judged that the driver is demanding a higher engine output, and the engine output is increased by reducing the number of fuel-cut cylinder or cylinders, resulting in behavior of slightly increased engine revolutions (Ne) to Ne 43 and vehicle speed (Vs) to Vs 43.

In either case, the engine 1 ensures smooth running while restraining shocks on the vehicle by not responding at all or only restrictively responding to the driver's accelerator operation. The failure of the vehicle running to follow at all, or following only at poor sensitivity, the accelerator operation enables the user to perceive the trouble with the vehicle.

Especially when the vehicle is running backward with the shift gear set to the reverse position, the driver is in an awkward position and often finds it difficult to operate the accelerator delicately. As a result, depending on the geometrical relationship between the accelerator pedal and the foot of the driver operating it, it is well conceivable that a shock of the speed change of the vehicle may cause the driver to further press down the pedal unintentionally. Therefore, reducing the engine output and suppressing the variation in output at the time of a system failure is considered a function of critical importance.

As described above, the minimum level of drivability is ensured by restraining the engine revolutions (engine output) by stopping fuel feed to a prescribed cylinder or cylinders or adjusting the engine output by changing the number of cylinders to which fuel feed is to be stopped according to the degree of accelerator operation by the driver, because it is impossible to select a step of speed change for high speed when the vehicle is running backward.

Embodiment 3

Figure 5:
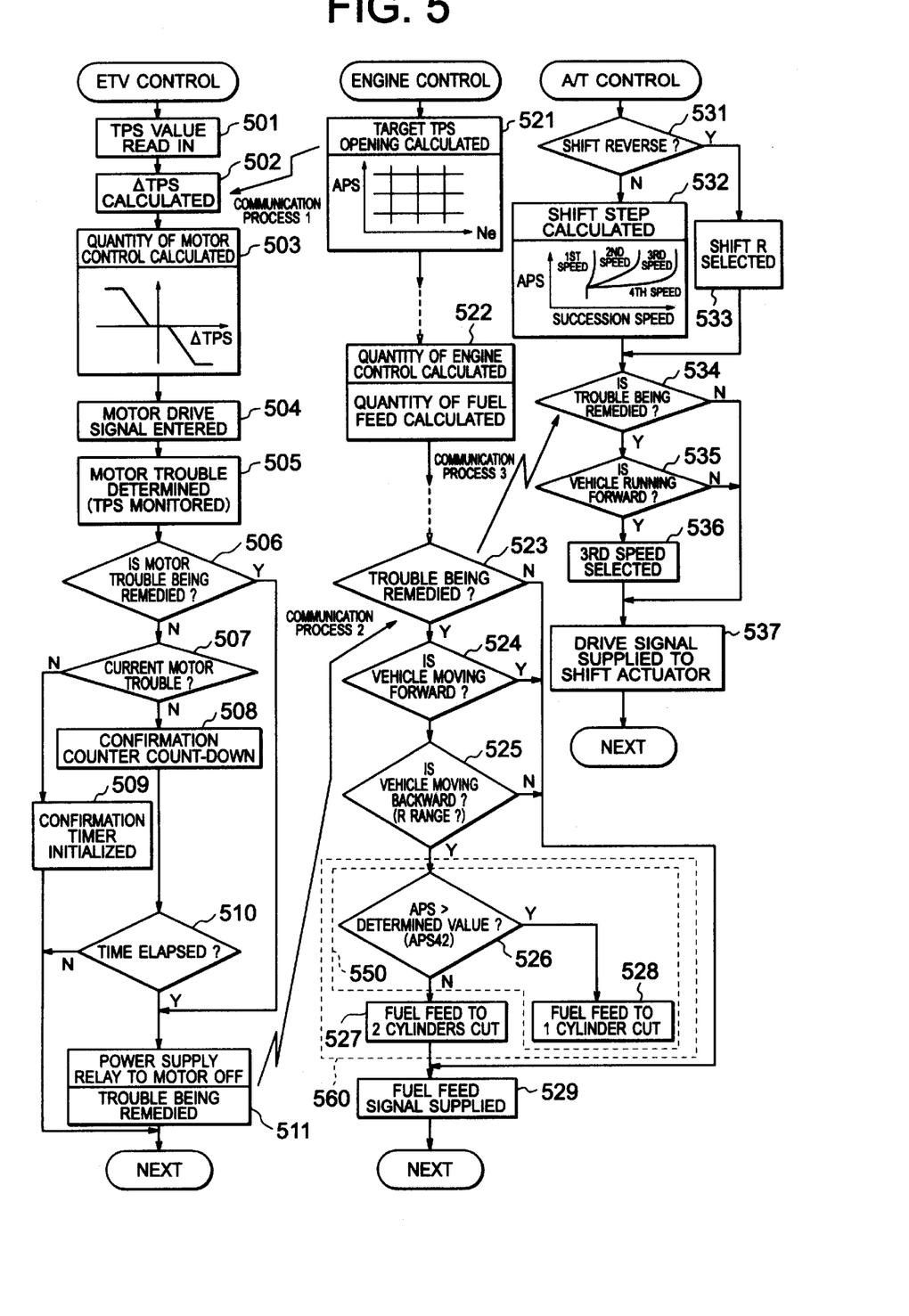
FIG. 5 is a flow chart illustrating the operations of different control units for describing an overall control system according to the invention.

FIG. 5 is a flow chart for collectively illustrating the control methods according to the invention.

In the chart, processing steps 501 through 511 refer to the controls effected by the throttle controller (ETV) 9 for electrically controlling the throttle valve; processing steps 521 through 529, those effected by engine control unit (ECU) 10; and processing steps 531 through 537, those of the transmission control unit (TCU) 11. In the chart, communication processes 1, 2 and 3 indicate the contents of communicated information and the timings of communication between different control units.

Description of Controls by the ETV 9

First, at processing step 501, the current position of the throttle valve 3 is read in from the throttle opening sensor 4 as the TPS value, and next at processing step 502 the deviation (ΔTPS) from a target throttle valve position (target TPS value) delivered from the ECU 10 by communication process 1 is calculated.

Then, in order to achieve convergence on the target throttle valve position, the quantity of control by the electric motor 5 according to ΔTPS is calculated at processing step 503 and, next at processing step 504, an electric signal corresponding to this quantity of control is supplied to the electric motor 5 driving the throttle valve 3 to actuate the electric motor 5 and thereby to control the throttle valve 3 to its target opening degree.

At the same time, whether or not the electric motor 5 is operating at the expected control value according to the current TPS level is monitored on the basis of the output of the throttle opening sensor 4 and, at processing step 505, it is detected that an abnormality has arisen in the electric motor 5 to prevent the electric motor 5 from being controlled by the ETV 9, and the failure of the electric motor 5 is thereby determined.

If determination 506 finds that processing against the motor failure is already taking place, the power supply relay 12 is directly turned off at processing step 511; motor control is released to shift the throttle valve 3 to a prescribed level which is mechanically determined; and the control mode is determined to be one of processing against the motor failure. However, if determination 506 finds that no processing against a motor failure is taking place and determination 507 further finds no current motor failure, a motor failure remedy confirmation timer is initialized to a prescribed count to complete processing.

On the other hand, if determination 507 finds a current motor failure, the prescribed count to which the motor failure remedy confirmation timer was initialized at processing step 509 is stepped down at processing step 508, and if the counting is completed, i.e. the period in which determination 510 finds a motor failure continuing for a prescribed length, the aforementioned processing against the motor failure is accomplished at processing step 511, at the same time the ECU 10 being notified of the ongoing processing against the motor failure by communication process 2.

Description of Controls Within the ECU

The depth to which the driver presses down the accelerator is detected from the output from the APS 8 as the output level the driver demands of the engine 1; the target throttle opening for achieving the demanded output of the engine 1 in accordance with this APS level and the current engine revolutions Ne is calculated from a table stored in advance at processing step 521, and this target throttle opening information is transmitted by the ETV controller 9 by way of communication process 1.

After that, the quantity of fuel feed according to the operating condition of the engine 1 is calculated at processing step 522. If determination 523 finds that no ETV motor trouble information was received from the ETV controller 9 by communication process 2 at processing step 511, a drive signal to the injector 6 is supplied at processing step 529 so that the quantity of fuel calculated at processing step 522 be fed as it is to all the cylinders. Or, if determination 523 finds any motor trouble, motor trouble information will be transmitted to the TCU 11 by communication process 3; and if determination 524 finds the vehicle to be in a state of running forward, or if determination 525 finds a neutral state, a drive signal to the injector 6 is directly supplied at processing step 529.

Next, if determination 525 finds the vehicle to be running backward (running in the R range), engine output suppression by cutting fuel feed to a specific cylinder or cylinders is executed at processing step 560. The output may be suppressed by cutting fuel feed to two cylinders at processing step 527, but if determination 526 finds the accelerator opening to be not less than a prescribed degree (APS42), at processing step 528, in addition to the fuel feed cut to the two cylinders, the number of cylinders to which the fuel feed is cut is reduced to one and a fuel drive signal for the prescribed cylinder is supplied to the injector to meet the driver's further demand for an engine output at the possible minimum.

A fuel cut is accomplished in such a manner that, with the vibration and output of the engine being taken into account, no two or more consecutive cylinders be affected: for instance, if it is a four-cylinder engine, fuel feed to the second and fourth cylinders is cut as in the case of this embodiment or, if it is a six-cylinder engine, fuel feed to the third and second cylinders is cut.

Controls Within the TCU

Determination 531 judges whether the shift lever of an automatic transmission (AT) vehicle is in a forward or the reverse position, and a step of speed change memorized in advance is selected at processing step 532 according to the current opening of the accelerator (APS output) and engine revolutions (Ne). If determination 531 finds the lever to be in the reverse position, the step of speed change for the R range is selected at processing step 533.

Next, unless information of remedying motor trouble is transmitted from the ECU 10 by communication process 3, a signal to change the AT to the selected step of speed change is supplied to the shift actuator of the transmission 2 at processing step 537. Or, conversely, determination 534 finds information of remedying motor trouble to have been transmitted by communication process 3 and determination 535 finds the AT shift lever to be in a forward position, the step of speed change for the third speed is selected at processing step 536, and a signal to change to the third speed is supplied to the shift actuator at processing step 537.

For the third speed of the step of speed change at processing step 536, a high speed step which is less sensitive to changes in the air intake and less susceptible to the shock of speed change is appropriate. Actually, however, when the motor is in trouble, the vehicle speed is determined by the quantity of air intake to the engine at a throttle valve opening which is mechanically determined by separating throttle valve 3 from motor control and the target vehicle speed to be reached at the time. Accordingly, the third speed is selected in this embodiment in spite of the fact that the vehicle's highest step of speed change is the fourth speed.

As described above, in an automatic transmission vehicle equipped with an electronic throttle control system, when the electronic throttle control system much as a throttle valve control motor or the like fails to work normally, the rise in engine acceleration and the shock to the body due to unnecessary speed change action can be reduced by stopping power supply to the motor to separate the throttle valve from the control system, mechanically fixing the throttle valve 3 in a preset position, and then fixing the step of speed change, if the vehicle is running forward, at a high speed position.

Or if the vehicle is running backward, the vehicle is enabled to run smoothly by stopping fuel feed due to the engine condition to a specific cylinder or cylinders to reduce the engine output, secondary trouble which might otherwise ensue from engine acceleration and a shock to the body due to mishandling or the like by the unnecessarily upset driver in case of abnormal working is prevented, and the driver is enabled to recognize with composure the trouble with the vehicle.

What is claimed is:

1. An output control system for automobile engines comprising:
    a throttle valve for adjusting the air intake to an engine;
    a drive control means for effecting drive control on this throttle valve;
    an opening detecting sensor for detecting the degree of opening of this throttle valve;
    a failure determining means for determining any trouble in said drive control means from any excessive opening of said throttle valve relative to the target condition of driving; and
    a vehicle speed fixing means for undoing the control action by said drive control means, when the failure determining means determines the failure of said drive control means, and fixes the vehicle speed at a preset value.

2. An output control system for automobile engines, as claimed in claim 1, wherein the vehicle speed fixing means determines the direction in which the vehicle is running, fixes the step of speed change at a high speed step if it determines the direction to be forward, and fixes the vehicle speed at a level corresponding to this fixed high speed step.

3. An output control system for automobile engines, as claimed in claim 2, wherein the vehicle speed fixing means determines the direction in which the vehicle is running, stops fuel feed to a specific cylinder or cylinders in the engine if it determines the direction to be backward, and fixes the vehicle speed by appropriately restricting the engine revolutions.

4. An output control system for automobile engines, as claimed in claim 3, wherein the vehicle speed fixing means varies the number of cylinders to which fuel feed is to be stopped according to the opening degree of the accelerator.

* * * * *